United States Patent
Ku et al.

(10) Patent No.: US 10,698,397 B2
(45) Date of Patent: Jun. 30, 2020

(54) HEATER CONDITION MONITORING AND ACCESSING METHOD AND APPLICATIONS THEREOF

(71) Applicant: INDUSTRIAL TECHNOLOGY RESEARCH INSTITUTE, Hsinchu (TW)

(72) Inventors: Hong-Chi Ku, Miaoli County (TW); Tsung-Jung Hsieh, Tainan (TW); Yao-Chung Hsu, Yunlin County (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 487 days.

(21) Appl. No.: 15/498,315

(22) Filed: Apr. 26, 2017

(65) Prior Publication Data

US 2018/0188719 A1 Jul. 5, 2018

(30) Foreign Application Priority Data

Dec. 30, 2016 (TW) .............................. 105144213 A

(51) Int. Cl.
G05B 23/02 (2006.01)
H05B 1/02 (2006.01)

(52) U.S. Cl.
CPC ....... *G05B 23/024* (2013.01); *G05B 23/0283* (2013.01); *H05B 1/0233* (2013.01)

(58) Field of Classification Search
CPC . G05B 23/024; G05B 23/0283; H05B 1/0233
See application file for complete search history.

(56) References Cited

U.S. PATENT DOCUMENTS 5,420,571 A 5/1995 Coleman et al.
5,683,605 A 11/1997 Matsuoka
(Continued)

FOREIGN PATENT DOCUMENTS

| CN | 105678295 A | 6/2016 |
| CN | 105759207 A | 7/2016 |
| EP | 2544124 A1 | 1/2013 |

OTHER PUBLICATIONS

J. Lee et al., "Development of a Predictive and Preventive Maintenance Demonstration System for a Semiconductor Etching Tool" *ECS Transactions*, 52 (1) 913-927 (2013).
(Continued)

*Primary Examiner* — Yoshihisa Ishizuka
(74) *Attorney, Agent, or Firm* — Muncy, Geissler, Olds & Lowe, P.C.

(57) ABSTRACT

A heater condition monitoring and accessing method includes steps as follows: A plurality of history operating data of a heater under test are acquired, wherein each of the history operating data has a temperature, an operating sequence, and a resistance. A plurality subsets of the history operating data corresponding to a predetermined temperature range are picked up from the history operating data to form a resistance-operating sequence characteristic curve. At least one test is performed according to the resistance-operating sequence characteristic curve to determine whether a fault of the heater under test occurs at the current operating run or at the subsequent operating run and to evaluate the remaining useful life of the heater under test.

13 Claims, 7 Drawing Sheets

(56) References Cited

U.S. PATENT DOCUMENTS

| | | |
|---|---|---|
| 5,747,777 A | 5/1998 | Matsuoka |
| 5,756,568 A | 5/1998 | Morita et al. |
| 5,945,471 A | 8/1999 | Morita et al. |
| 6,718,283 B2 | 4/2004 | Lanham et al. |
| 6,775,624 B2 | 8/2004 | Storino |
| 7,406,644 B2 | 7/2008 | Kaushal et al. |
| 8,121,799 B2 | 2/2012 | Terasawa et al. |
| 2008/0183404 A1 | 7/2008 | Emami et al. |
| 2009/0254287 A1 | 10/2009 | Ohgoh |
| 2013/0179129 A1* | 7/2013 | Patankar ............ G05B 23/0243 703/2 |
| 2014/0025315 A1* | 1/2014 | Cheng ................ G05B 23/0283 702/34 |
| 2014/0189440 A1 | 7/2014 | Ba |
| 2016/0349293 A1* | 12/2016 | Chattopadhyay ...... G01R 21/00 |

OTHER PUBLICATIONS

T. Wong et al., "A Similarity-Based Prognostics Approach for Remaining Useful Life Estimation of Engineered Systems" *2008 International Conference on Prognostics and Health Management*, 2008, 6 pages.

L. Yang "Methodology of Prognostics Evaluation for Multiprocess Manufacturing Systems" Dissertation submitted to the Graduate School of the University of Cincinnati, Jan. 2011, 143 pages.

\* cited by examiner

HEATER CONDITION MONITORING AND ACCESSING METHOD AND APPLICATIONS THEREOF

CROSS REFERENCE TO RELATED APPLICATIONS

This application claims the benefit of Taiwan application Serial No. 105144213, filed Dec. 30, 2016, the subject matter of which is incorporated herein by reference.

TECHNICAL FIELD

The disclosure relates in general to a method for monitoring and accessing the condition of a processing device and applications thereof.

BACKGROUND

Tuning a temperature controller involved in a heater used in the process for forming a semiconductor device or other electronic device is typically performed based on a liner relationship between the temperature and the resistance or a liner relationship between the temperature and the voltage of the heater. However, as the fabrication steps in semiconductor technology become more complicated, it gets harder to monitor the operating condition of the heater step by step. The heater thus may either be prematurely replaced before it gets out of order or be tardily replaced after the performance thereof gets out of hand. Unnecessary cost, on one hand, may occur due to the premature replacement of the heater; the fabricating process, on the other hand, may fail due to the failure performance of the tardily replaced heater.

Therefore, there is a need of providing a heater condition monitoring and accessing method and applications thereof to estimate the remaining useful life of the heater under test and to replace it at the optimum replacement point.

SUMMARY

According to one embodiment of the present disclosure, a heater condition monitoring and accessing method is provided, wherein the method includes steps as follows: A plurality of history operating data of a heater under test are acquired, wherein each of the history operating data has a temperature, an operating sequence, and a resistance. Plurality subsets of the history operating data corresponding to a predetermined temperature range are picked up from the history operating data to form a resistance-operating sequence characteristic curve. At least one test is performed according to the resistance-operating sequence characteristic curve to determine whether a fault of the heater under test occurs at the current operating run or at the subsequent operating run and to estimate the remaining useful life of the heater under test.

According to another embodiment of the present disclosure, a non-transitory computer-readable storage media is provided, wherein the non-transitory computer-readable storage media stores a plurality instructions, when one of the instructions is read, the aforementioned heater condition monitoring and accessing method can be performed.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
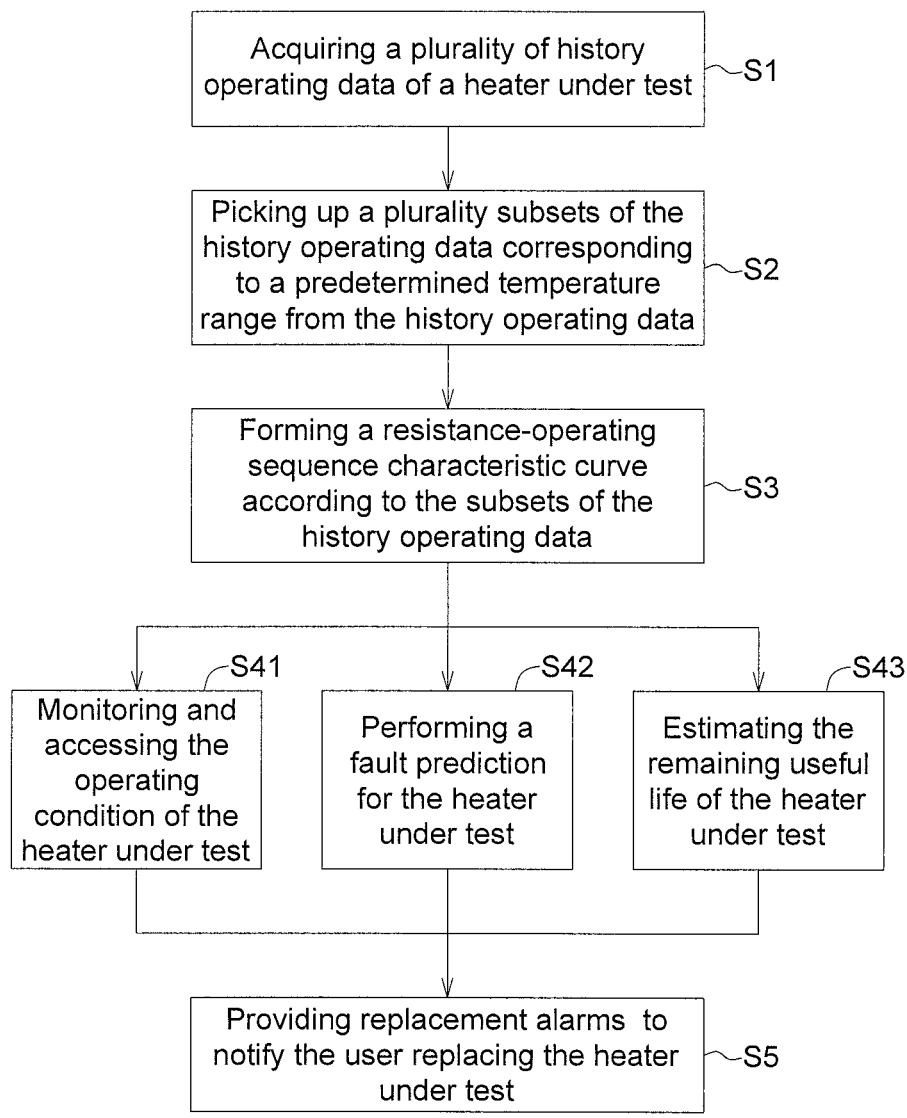
FIG. 1 is a flow chart illustrating a heater condition monitoring and accessing method according to one embodiment of the present disclosure.

According to the present disclosure, a heater condition monitoring and accessing method and applications thereof are provided to estimate the remaining useful life of the heater and its optimum replacement point, whereby the unnecessary cost due to the premature replacement of the heater and process failure due to the tardy replacement of the heater can be avoided. A number of embodiments of the present disclosure are disclosed below with reference to accompanying drawings.

However, the structure and content disclosed in the embodiments are for exemplary and explanatory purposes only, and the scope of protection of the present disclosure is not limited to the embodiments. Designations common to the accompanying drawings and embodiments are used to indicate identical or similar elements. It should be noted that the present disclosure does not illustrate all possible embodiments, and anyone skilled in the technology field of the invention will be able to make suitable modifications or changes based on the specification disclosed below to meet actual needs without breaching the spirit of the invention. The present disclosure is applicable to other implementations not disclosed in the specification. In addition, the drawings are simplified such that the content of the embodiments can be clearly described, and the shapes, sizes and scales of elements are schematically shown in the drawings for explanatory and exemplary purposes only, not for limiting the scope of protection of the present disclosure.

FIG. 1 is a flow chart illustrating a heater condition monitoring and accessing method according to one embodiment of the present disclosure, wherein the method includes steps as follows:

A plurality of history operating data of a heater subjected to a health and performance evaluation (thereinafter referred to as the heater under test) are acquired (see the step S1 of FIG. 1). In some embodiments of the present disclosure, the history operating data can be acquired by recording the operating parameters of the heater under test during either the same operation or various operations. The heater under test may be an electrical resistance heater device involved in a radiant heating apparatus applied by semiconductor technology.

In the present embodiment, a real-time monitoring is utilized to detect the thermal operating parameters, such as current, voltage, resistance, power and temperature, applied in each operating process of the thermal operation for a time period from the starting point that the heater under test is used for the first time to the end point that the heater under test is out of order and needed to be replaced. The detected thermal operating parameters are then recorded in a computer database system, whereby the history operating data of the thermal operation including the operating parameters (of current, voltage, resistance, power and temperature) corresponding to the operating time sequence (second) can be thus acquired.

Figure 2A:
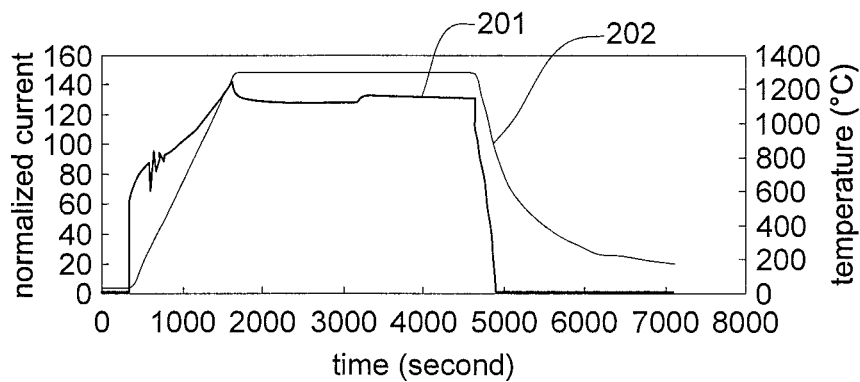
FIG. 2A is a curve diagram formed by a subset of history operating data collected from one single operating process of the heater under test and illustrating the relationship between the current passing through the heater under test and its operating time sequence as well as the relationship between the operating temperature and the operating time sequence thereof.
Figure 2B:
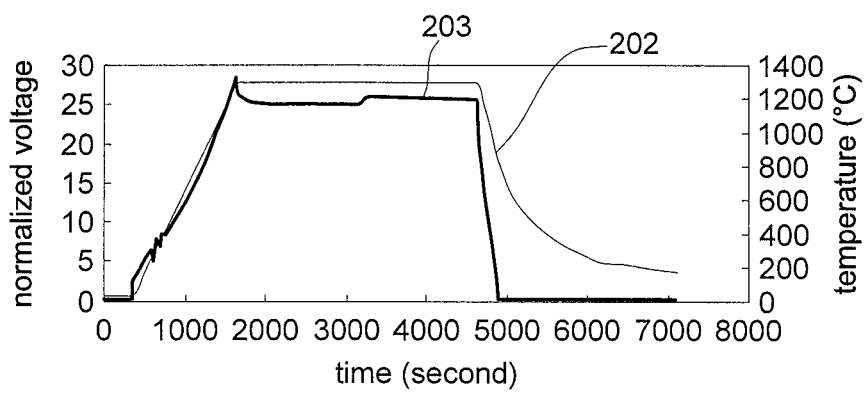
FIG. 2B is a curve diagram formed by a subset of history operating data collected from one single operating process of the heater under test and illustrating the relationship between the voltage applied on the heater under test and its operating time sequence as well as the relationship between the operating temperature and the operating time sequence thereof.

FIG. 2A is a curve diagram formed by a subset of the history operating data collected from one single operating process of the heater under test and illustrating the relationship between the current passing through the heater under test and its operating time sequence as well as the relationship between the operating temperature and the operating time sequence thereof; and FIG. 2B is a curve diagram formed by a subset of the history operating data collected from one single operating process of the heater under test and illustrating the relationship between the voltage applied on the heater under test and its operating time sequence as well as the relationship between the operating temperature and the operating time sequence thereof. The horizontal axis of the curve diagrams depicted in FIGS. 2A and 2B represent the operating time (second), the vertical axis of the curve diagrams respectively represent the current (as shown in FIG. 2A) passing through the heater under test and the voltage (as shown in FIG. 2B) applied there to, wherein the current and the voltage are normalized. The curve 201 depicted in FIG. 2A illustrates the relationship between the current passing through the heater under test and its operating time (s); the curve 202 depicted in FIG. 2A illustrates the relationship between the operating temperature and the operating time sequence (s) of the heater under test; and the curve 203 depicted in FIG. 2B illustrates the relationship between the voltage applied to the heater under test and its operating time (s) during the one single operating process.

When a sufficient amount of history operating data including the operating parameters of the heater under test, such as current, voltage, resistance, power and temperature, are collected and recorded in the computer database system, plurality subsets of the history operating data corresponding to a predetermined temperature range can be picked up from the computer database system (see the step S2 of FIG. 1). For example, the subsets of the history operating data can be picked up by reading the files recording the operating parameters of the heater under test, such as current, voltage, resistance, power and temperature, corresponding to the predetermined temperature range in the computer database system through a data acquisition (DAQ) interface card. For example, in some embodiments of the present disclosure, the predetermined temperature range may be a heating range having a temperature difference ranging from 1° C. to 150° C. In the present embodiment, the operating parameters of the heater under test, such as current, voltage, resistance, power and temperature, corresponding to the heating temperature range of 1250° C. to 1300° C. can be picked up from the computer database system.

A plurality of operating parameter-operating time characteristic curves (not shown) are then formed according to the picked up subsets of the history operating data, wherein each of the operating parameter-operating time characteristic curves may illustrate the distribution of an individual operating parameter along its operating time. The operating time of the operating parameter-operating time characteristic curves can be divided into several operating sequences (runs) each of which represents the time sequence and time interval of an individual heating operation performed by the heater under test within the predetermined temperature range. The parameter data (such as current, voltage, resistance, power and temperature) that are allocated within the same operating sequence are then sum up and averaged to obtain its average value, whereby a plurality operating parameter-operating sequence characteristic curves converted from the operating parameter-operating time characteristic curves are thus prepared.

Figure 3A:
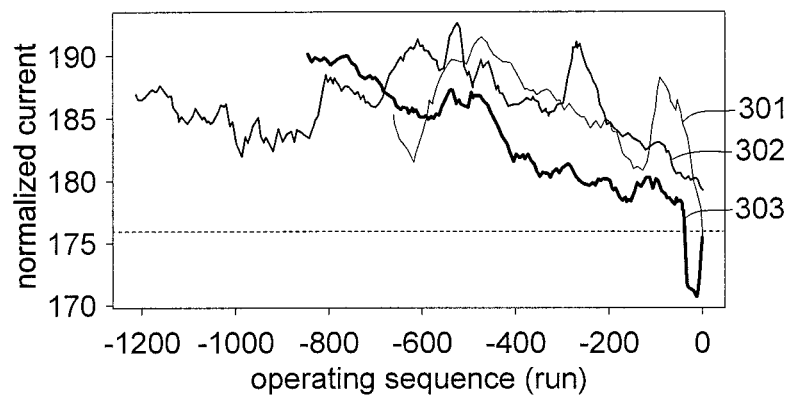
FIG. 3A is a curve diagram illustrating a plurality of normalized current-operating sequence characteristic curves resulted from the history operating data of different heaters that has identical structure.

FIG. 3A is a curve diagram illustrating a plurality of normalized current-operating sequence characteristic curves 301, 302 and 303 resulted from the history operating data of different heaters that has identical structure.

Figure 3B:
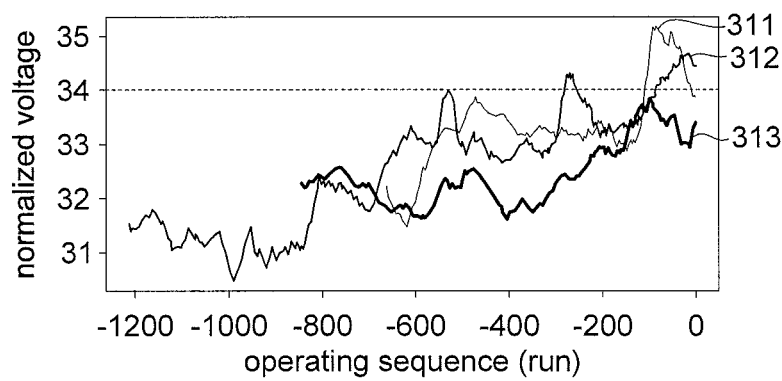
FIG. 3B is a curve diagram illustrating a plurality of normalized voltage-operating sequence characteristic curves resulted from the history operating data of different heaters that has identical structure.
Figure 3C:
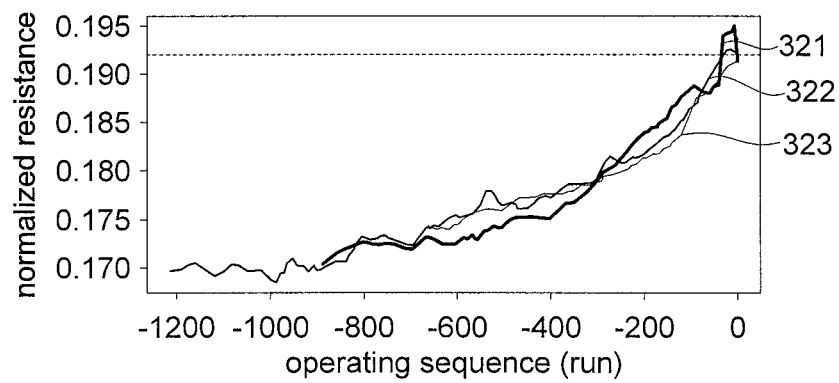
FIG. 3C is a curve diagram illustrating a plurality of normalized resistance-operating sequence characteristic curves resulted from the history operating data of different heaters that has identical structure.
Figure 3D:
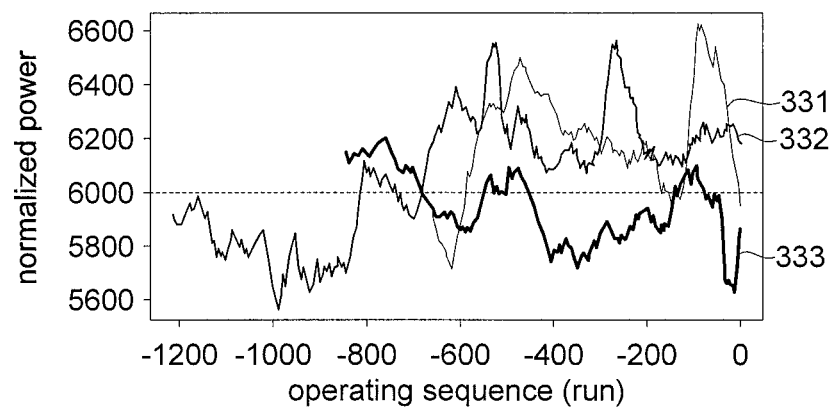
FIG. 3D is a curve diagram illustrating a plurality of normalized powder-operating sequence characteristic curves resulted from the history operating data of different heaters that has identical structure.
Figure 3E:
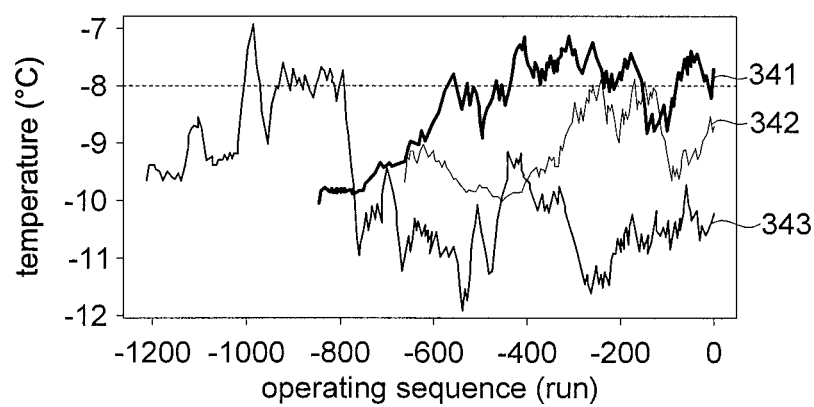
FIG. 3E is a curve diagram illustrating a plurality of operating temperature-operating sequence characteristic curves resulted from the history operating data of different heaters that has identical structure.

FIG. 3B is a curve diagram illustrating a plurality of normalized voltage-operating sequence characteristic curves 311, 312 and 313 resulted from the history operating data of different heaters that has identical structure. FIG. 3C is a curve diagram illustrating a plurality of normalized resistance-operating sequence characteristic curves 321, 322 and 323 resulted from the history operating data of different heaters that has identical structure. FIG. 3D is a curve diagram illustrating a plurality of normalized powder-operating sequence characteristic curves 331, 332 and 333 resulted from the history operating data of different heaters that has identical structure. FIG. 3E is a curve diagram illustrating a plurality of operating temperature-operating sequence characteristic curves 341, 342 and 343 resulted from the history operating data of different heaters that has identical structure.

In comparison with the operating parameter (such as current, voltage, resistance, power and temperature)-operating sequence characteristic curves as depicted in FIGS. 3A to 3E, it can be determined that the normalized resistance-operating sequence characteristic curves 321, 322 and 323 resulted from the history operating data of different heaters having identical structure may have the most consistent trend. Accordingly, the normalized resistance-operating sequence characteristic curve of the heater under test may be more suitable than other operating parameter-operating sequence characteristic curves to serve as the characteristic curve for monitoring and accessing the condition of the heater under test, predicting whether a fault occurs at the current operating run or at the subsequent operating run and evaluating its remaining useful life.

Figure 4:
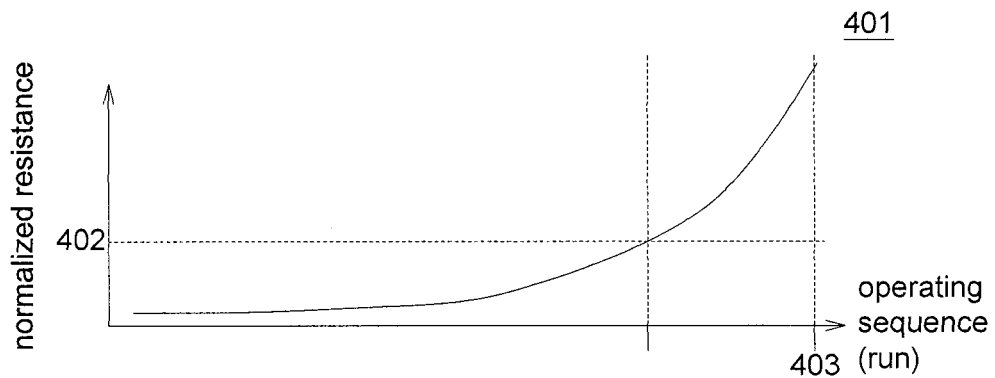
FIG. 4 is a curve diagram illustrating a normalized resistance-operating sequence characteristic curve used to determine the current operation condition of the heater under test, to predict whether a fault of the heater under test occurs at the current operating run or at the subsequent operating run and to estimate the remaining useful life of the heater under test.

FIG. 4 is a curve diagram illustrating a normalized resistance-operating sequence characteristic curve 401 used to determine the current operation condition of the heater under test, to predict whether a fault of the heater under test occurs at the current operating run or at the subsequent operating run and to evaluate the remaining useful life of the heater under test. In some embodiments of the present disclosure, the process for forming the normalized resistance-operating sequence characteristic curve 401 includes a smoothing treatment subjected to an initial current-operating sequence characteristic curve of the heater under test containing the average resistance values corresponding to each of the operating sequences. In the present embodiment, a moving average (MA) method is applied to smooth the initial current-operating sequence characteristic curve of the heater under test.

Figure 5:
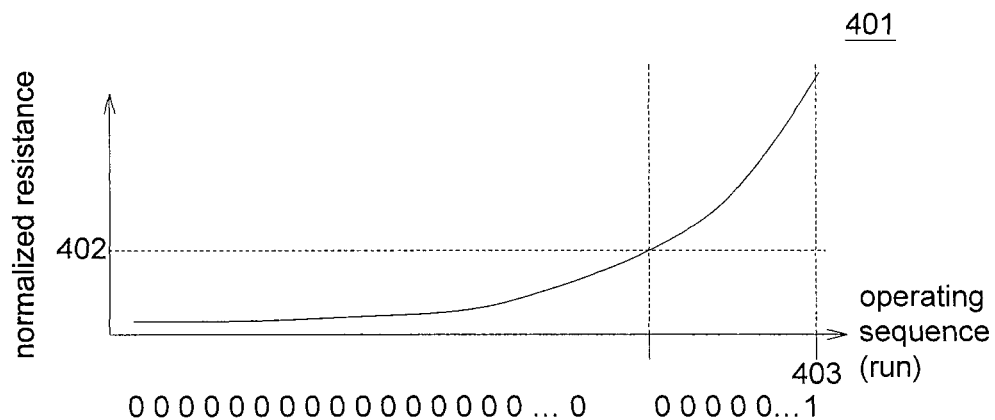
FIG. 5 is a graphic diagram illustrating a method for evaluating the accurate reliability of the fault prediction using the normalized resistance-operating sequence characteristic curve of the heater under test as a health and performance evaluation curve.
Figure 6:
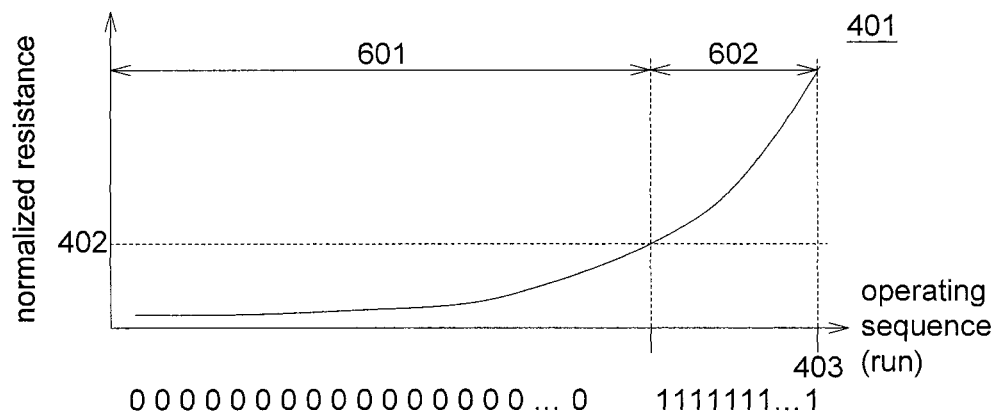
FIG. 6 is a graphic diagram illustrating a method for evaluating the accurate reliability of the fault prediction using the normalized resistance-operating sequence characteristic curve of the heater under test.

The method for monitoring and accessing the condition of the heater under test (see the step S41 in FIG. 1) includes steps as follows: Firstly, it is assumed that the resistance of the heater under test measured at the last operating sequence 403 (i.e., the point where the heater under test is failure and requiring replacement of a new heater) is greater than a certain alarm threshold resistance 402 (denoted by reference numeral 1); and that the resistance of the heater under test measured at the other operating sequence is less than the alarm threshold resistance 402 (denoted by reference numeral 0) are true (as depicted in FIG. 5). Next, the assumption is then verified by comparing the real resistance of the heater under test to the alarm threshold resistance 402 of the normalized resistance-operating sequence characteristic curve 401. When the resistance of the heater under test measured at the last operating run is greater than the alarm threshold resistance 402, it is indicated as true positive (TP); when the resistance of the heater under test does not conform to the above-mentioned assumption, it is indicated as false positive (FP). A true positive rate (TPR) and a false positive rate (FPR) are then determined by calculating the proportions of the number of TP and the number of FP in the total number of operating sequences to serve as the criteria for monitoring and accessing the condition of the heater under test.

In some embodiments of the present disclosure, the alarm threshold resistance 402 of the normalized resistance-operating sequence characteristic curve 401 can be determined by an optimization process, wherein the values of the TPR and FPR may serve as performance indicators, and a grid search is applied to estimate all condition portfolios, so as to find the optimal performance.

In the present embodiment, the alarm threshold resistance 402 of the normalized resistance-operating sequence characteristic curve 401 determined by the optimal TPR and FPR values may be 0.192 Ohm (Ω). When the real resistance of the heater under test is greater than the alarm threshold resistance 402, replacement alarms can be then provided to notify the user replacing the heater (see the step S5 in FIG. 1).

In some embodiments of the present disclosure, three heaters (such as heater 1, heater 2 and heater 3) are subjected to the test using the normalized resistance-operating sequence characteristic curve 401 for monitoring and accessing their conditions. The other parameters, such as voltage, the power, the current and the temperature, picked up from the history operating data of these three heaters can be also used to form a plurality of normalized voltage-operating sequence characteristic curves, normalized power-operating sequence characteristic curves, normalized current-operating sequence characteristic curves and temperature-operating sequence characteristic curves by the aforementioned method for monitoring and accessing their conditions and serving as comparison embodiments. The accuracy in monitoring and accessing the operating condition of these heaters under test using different parameters may be evaluated, and the evaluated results are illustrated in Table 1:

TABLE 1

| Parameters | | Heater 1 | Heater 2 | Heater 3 | Average |
|---|---|---|---|---|---|
| Resistance | TPR | 100% | 100% | 100% | 100% |
| | FPR | 0.45% | 3.83% | 2.97% | 2.64% |
| Power | TPR | 0% | 0% | 0% | 0% |
| | FPR | 48% | 0% | 15.8% | 21.3% |
| Current | TPR | 100% | 100% | 100% | 100% |
| | FPR | 48.9% | 73.8% | 41.1% | 54.6% |
| Voltage | TPR | 100% | 0% | 100% | 66.7% |
| | FPR | 33.9% | 0% | 17.5% | 17.1% |
| Temperature | TPR | 0% | 0% | 100% | 33.3% |
| | FPR | 64.9% | 21.1% | 82.8% | 56.3% |

According to Table 1, when the normalized resistance-operating sequence characteristic curve 401 is used to monitor and access the operating condition of these heaters under test, the TPR of these three heaters under test are all 100%, and the FPR of these three heaters under test are less than 30%; otherwise, when the other parameters-operating sequence characteristic curves are used to monitor and access the operating condition of these heaters under test, the variation of the FPR and the FPR among the comparison embodiments is quite large. When the normalized current-operating sequence characteristic curves and the voltage-operating sequence characteristic curves are used to monitor and access the operating condition of these heaters under test, the TPR of these three heaters under test can be greater than 60%, and the FPR of the comparison embodiments are greater than 15%. When the normalized current-operating sequence characteristic curves and the temperature-operating sequence characteristic curves are used to monitor and access the operating condition of these heaters under test, the FPR even greater than 50%. It can be indicated that high reproducibility and accuracy can be obtained by using the normalized resistance-operating sequence characteristic curve 401 to monitor and access the operating condition of these heaters under test.

These heaters under test can be subjected to a fault prediction (see the step S42 in FIG. 1). In some embodiments of the present disclosure, a regression or classification algorithm, such as a logistic regression (LR) algorithm, a random forest (RF) algorithm, a support Vector Machine (SVM) algorithm, an autoregressive integrated moving average (ARIMA) algorithm or the arbitrary combinations thereof, may be used to predict the fault occurring on the heaters under test. The fault prediction may include steps as follows:

A model is firstly established according to the resistance and operating sequence picked up from the history operating data of the heaters under test, wherein the model may be a regression or classification model. A resistance of the next time operating run of the heater under test can be successively predicted by the model. The predicted resistance is then compared with the alarm threshold resistance 402 of the normalized resistance-operating sequence characteristic curve 401 to determine whether a fault of the heater under test occurs at the next time operating run. When the predicted resistance is greater than the alarm threshold resistance 402, it means that fault of the heater under test may occur at the next time operating run, and replacement alarms can be then provided to notify the user replacing the heater (see the step S5 in FIG. 1).

The accuracy of the fault prediction using the regression or classification algorithm may be estimated by the method described as follows: It is assumed that the first 98% of the total operation runs (the sum of the operation runs from the start operation to fault occurs) of the heater under test that are allocated in a normal group 601 has the resistance less than the alarm threshold resistance 402 of the normalized resistance-operating sequence characteristic curve 401 (denoted by the reference numeral 0); and that the last 2% of the total operation runs of the heater under test that are allocated in an alarm group 602 has the resistance greater than the alarm threshold resistance 402 of the normalized resistance-operating sequence characteristic curve 401 (denoted by the reference numeral 1) are true.

Next, the assumption is then verified by comparing the predicted resistance to the alarm threshold resistance 402 of the normalized resistance-operating sequence characteristic curve 401. As long as there is one of the predicted resistance of the heater under test that is allocated in the alarm group 602 is greater than the alarm threshold resistance 402 of the normalized resistance-operating sequence characteristic curve 401, it is indicated as true positive (TP); and when the predicted resistance of the heater under test that is allocated in the normal group 601 is greater than the alarm threshold resistance 402 of the normalized resistance-operating sequence characteristic curve 401, it is indicated as false positive (FP). A TPR and a FPR are then determined by calculating the proportions of the number of TP and the number of FP in the total number of the sum of the operation runs to serve as the criteria for evaluating the accuracy of the fault prediction using the regression or classification algorithm.

In the present embodiment, several regression or classification models respectively using the algorithms of LR, RF, SVM, and ARIMA are established, and there are three heaters subjected to the fault prediction to predict the resistance of the next time operating run of the heaters under test successively. The accuracy of the fault prediction using different regression or classification models can be estimated, and the estimated results are illustrated in Table 2:

TABLE 2

| Algorithm | | heater 1 | heater 2 | heater 3 |
|---|---|---|---|---|
| LR | TPR | 100% | 100% | 100% |
|  | FPR | 12.40% | 12.59% | 5.06% |
| RF | TPR | 0% | 100% | 100% |
|  | FPR | 0% | 1.96% | 0.59% |

TABLE 2-continued

| Algorithm | | heater 1 | heater 2 | heater 3 |
|---|---|---|---|---|
| SVM | TPR | 100% | 100% | 100% |
|  | FPR | 4.19% | 2.31% | 2.53% |
| ARIMA | TPR | 100% | 100% | 100% |
|  | FPR | 0% | 2.19% | 0.59% |
| Ensemble | TPR | 100% | 100% | 100% |
| result | FPR | 0% | 2.19% | 0.59% |

According to Table 2, it is indicated that the fault prediction using ARIMA model has the best accuracy. In some embodiments of the present disclosure, the prediction results using various regression or classification models may be integrated to obtain an ensemble result by an ensemble learning method using a voting mechanism to select the suitable prediction results. In the present embodiment, a plurality voting mechanism is used to select the suitable prediction results. By using the ensemble learning method, the TPR of the fault prediction accuracy may be increased up to 100%, and the FPR thereof may be reduced to less than 3%.

In some embodiments of the present disclosure, a classification technology may be also applied to perform the fault prediction of the heater under test. The fault prediction using the classification technology may include steps as follows: The resistance and operating sequence picked up from the history operating data of the heaters under test is used to serve as a feature; a predicted result that indicate whether a fault of the heater under test occurs at a predetermined operating run is used to serve as a label; and the feature and label are used to establish a training model by binary classification algorithms. Next, the resistances of the heater under test measured in the current operating run and the previous operating run are substituted into this training model, and whether a fault of the heater under test occurs at the next operating run can be thus predicted.

The remaining useful life of the heater under test can be also estimated by the history operating data (see the step S42 in FIG. 1). In some embodiments of the present disclosure, the method for estimating the remaining useful life of the heater under test includes steps as follows: Plural sets of history operating data are respectively acquired from several reference heaters. An exponential regression model is then established according to a plurality of resistances and operating sequences picked up from the history operating data of each reference heater, so as to form a resistance-operating sequence training curve, such as the resistance-operating sequence training curves 701 and 702, for each reference heater. A resistance-operating sequence characteristic curve 703 of a heater under test is also obtained by the same way using the resistances and operating sequences picked up from the history operating data that are measured and collected from start operation to the current operation of the heater under test.

Figure 7A:
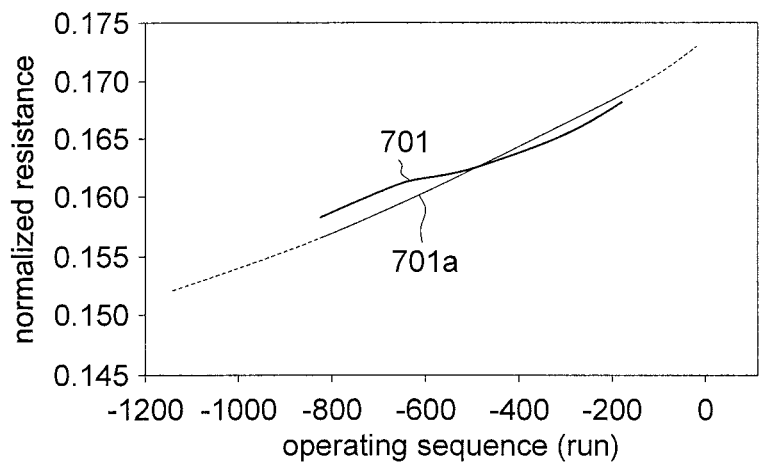
FIGS. 7A to 7C are curve diagrams illustrating an exponential curve fitting method in which a normalized current-operating sequence characteristic training curve is used to fit the normalized current-operating sequence characteristic curve of the heater under test with an exponential model.
Figure 7B:
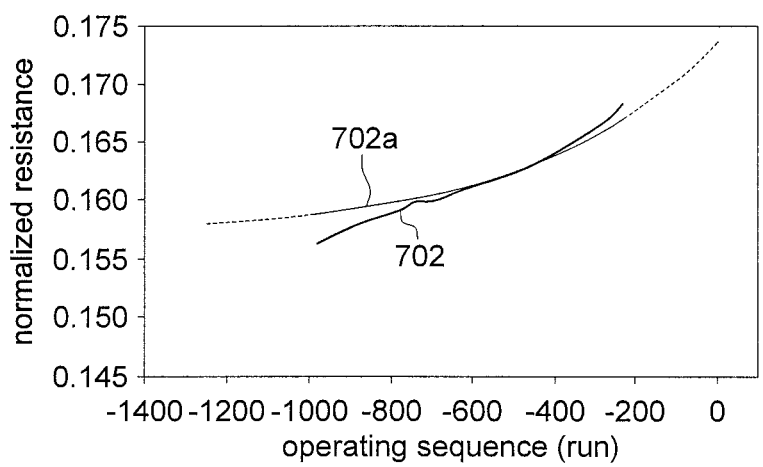
Figure 7C:
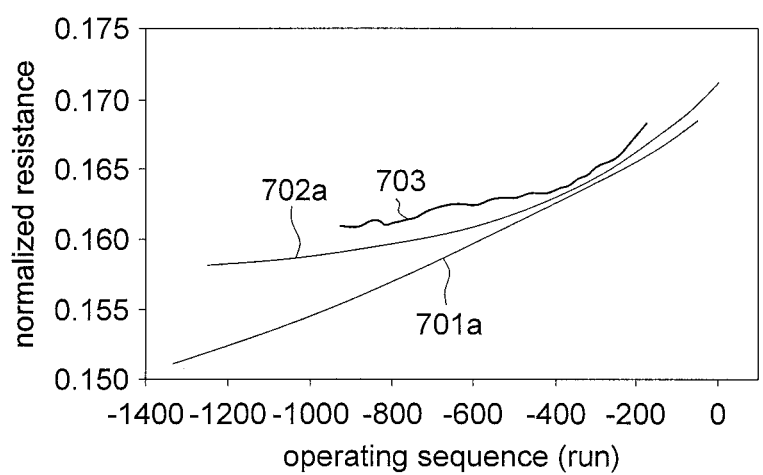

In detail, plural sets of history operating data are respectively acquired from several reference heaters, and an exponential regression model is then established according to a plurality of resistances and operating sequences picked up from the history operating data of each reference heater, so as to form a resistance-operating sequence training curve, such as the resistance-operating sequence training curves 701 and 702, for each reference heater. A resistance-operating sequence characteristic curve 703 of a heater under test is also obtained by the same way using the history operating data that are measured and collected from start operation to the current operation of the heater under test. Some curve segments, such as curve segments 701*a* and 701*b* (see FIGS. 7A and 7B), that are most similar to the resistance-operating sequence characteristic curve 703 of the heater under test are selected form the resistance-operating sequence training curves 701 and 702 of the reference heaters by a similarity comparison method used to measure the Euclidean distance between these curves. A remaining useful life of the heater under test corresponding to one of the reference heaters can be estimated according to the curve segments 701*a* and 701*b* respectively selected from the resistance-operating sequence training curves 701 and 702 of the reference heaters by an exponential curve fitting algorithm (see FIG. 7C). The estimated values of the remaining useful life of the heater under test are weighted and averaged to obtain a final prediction value of the remaining useful life. It should be appreciated that the amount of the reference heaters and the selected curve segments may not limited to this regards, nevertheless there are merely two curve segments 701*a* and 701*b* selected from the resistance-operating sequence training curves 701 and 702 of the reference heaters are described. In some other embodiments, there are more reference heaters and more curve segments may be applied to perform the remaining useful life estimation of the heater under test.

In some embodiments of the present disclosure, the aforementioned method for monitoring and accessing the condition of the heater under test, the fault prediction and the remaining useful life estimation can be built in a non-transitory computer-readable medium, such as a hard disc, a soft disc, a compact disc read-only memory (CD-ROM) or any suitable computer-readable medium, in which a plurality instructions are stored, when one of the instructions is read, the aforementioned heater condition monitoring and accessing method can be performed.

In according to the aforementioned embodiments, a heater condition monitoring and accessing method and the applications thereof are provided. Pluralities of history operating data of a heater under test are acquired. A plurality of temperatures, operating sequences, and a resistances corresponding to a predetermined temperature range are then picked up from the history operating data to form a resistance-operating sequence characteristic curve. Plurality subsets of the history operating data corresponding to a predetermined temperature range are picked up from the history operating data to form a resistance-operating sequence characteristic curve. At least one test is performed according the resistance-operating sequence characteristic curve to monitor or access the operating condition of a heater under test, to determine whether a fault of the heater under test occurs at the current operating run or at the subsequent operating run and to evaluate the remaining useful life of the heater under test. The user can be informed on time when a fault of the heater under test is predicted and it can be replaced at the optimum replacement point. As a result, unnecessary cost due to the premature replacement of the heater may not occur, and the fabricating process may not fail due to the failure performance of the tardily replaced heater.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A heater condition monitoring and accessing method comprising:
    acquiring a plurality of history operating data of a heater under test, wherein each of the history operating data has a temperature, an operating sequence, and a resistance, and wherein acquiring the history operating data of the heater under test comprises:
        utilizing a real-time monitoring to detect the resistance of the history operating data corresponding to an operating time sequence;
        dividing the operating time sequence into a plurality of operating sequences (runs) according to a time interval of an individual heating operation performed by the heater under test; and
        at least two of the resistance that are allocated within the same operating sequence are summed up and averaged to obtain an average resistance value corresponding to each of the operating sequences;
    picking up a plurality subsets of the history operating data corresponding to a predetermined temperature range from the history operating data to form a resistance-operating sequence characteristic curve;
    determining whether a fault of the heater under test occurs at a current operating run or at a subsequent operating run and estimating a remaining useful life of the heater under test according to the resistance-operating sequence characteristic curve.

2. The method according to claim 1, wherein forming the resistance-operating sequence characteristic curve comprises a smoothing treatment subjected to the average resistance value corresponding to each of the operating sequences.

3. The method according to claim 2, wherein the smoothing treatment comprises a moving average (MA) method.

4. The method according to claim 1, wherein the predetermined temperature range is a heating range having a temperature difference ranging from 1° C. to 150° C.

5. The method according to claim 1, further comprising:
    performing an optimization process to the resistance-operating sequence characteristic curve to determine an alarm threshold resistance; and
    determining whether a fault of the heater under test occurs according to the alarm threshold resistance.

6. The method according to claim 5, wherein the optimization process comprises a grid search.

7. The method according to claim 5, wherein determining whether a fault of the heater under test occurs comprises:
    obtaining a predicted resistance according to the resistance-operating sequence characteristic curve; and
    comparing the predicted resistance with the alarm threshold resistance.

8. The method according to claim 7, wherein the process for forming the resistance-operating sequence characteristic curve comprises establishing a model according to the history operating data.

9. The method according to claim 8, wherein the model is a regression model or a classification model.

10. The method according to claim 8, wherein the model is based on at least one of a logistic regression (LR) algorithm, a random forest (RF) algorithm, a support Vector Machine (SVM) algorithm and an autoregressive integrated moving average (ARIMA) algorithm.

11. The method according to claim 1, wherein forming the resistance-operating sequence characteristic curve comprises establishing a training model according to the history operating data by a binary classification algorithm.

12. The method according to claim 1, wherein estimating the remaining useful life of the heater under test comprises:
obtaining a plurality of resistance-operating sequence training curves according to a plurality of history operating data of a plurality of reference heaters; and
selecting at least one of the resistance-operating sequence training curves corresponding to the resistance-operating sequence characteristic curve by an exponential curve fitting algorithm.

13. A non-transitory computer-readable storage media in which a plurality of instructions are stored, when one of the instructions is read, the heater condition monitoring and accessing method according to claim 1 is performed.

* * * * *